Oct. 3, 1944. C. BLENMAN, JR 2,359,294
AVIATION TRAINING APPARATUS
Filed Feb. 18, 1943 3 Sheets-Sheet 1

INVENTOR
Charles Blenman, Jr.
BY
ATTORNEY

Oct. 3, 1944.                    C. BLENMAN, JR                    2,359,294
                         AVIATION TRAINING APPARATUS
                           Filed Feb. 18, 1943                3 Sheets-Sheet 2

INVENTOR
Charles Blenman, Jr.
BY
ATTORNEY

Patented Oct. 3, 1944

2,359,294

UNITED STATES PATENT OFFICE 2,359,294

AVIATION TRAINING APPARATUS

Charles Blenman, Jr., United States Navy

Application February 18, 1943, Serial No. 476,285

13 Claims. (Cl. 35—12)

(Granted under the act of March 3, 1883, as amended April 30, 1928; 370 O. G. 757)

The present invention relates to aviation training apparatus and more particularly to apparatus of the stated character for training pilots to fly on radio range beams under conditions of actual flight where the usual radio range beacons are not available or are inconveniently situated.

Where pilots have completed their basic instrument training in flying on radio range beams producing aural signals, it is desirable to provide an advanced form of controlled training under conditions of actual flight and to make provision upon completion of this advanced training for periodically reviewing this type of radio beam flying. While flight on regularly established radio range stations or beacons of the aural type provides a satisfactory form of advanced training, such training is not always possible because of the volume of traffic on the civil airways, the absence or relative inaccessibility of these radio range stations and the fact that the antenna systems on some aircraft are not suited for satisfactory beam flying.

In order, therefore, to train pilots in radio beam flying under conditions of actual flight where radio range stations or beacons of the aural type are not available, there is provided, in accordance with the present invention, an apparatus capable of producing an artificial aural radio range signal which is installed in the airplane used on the training flight. If such apparatus is to be effective for its intended purpose it is essential that it produce a realistic radio range signal, that it be under the control of an instructor or safety pilot and that it generate no radio frequency energy to avoid interference with the reception of the radio receiver carried by the airplane.

The apparatus in the preferred embodiment of the present invention includes a conventional audio frequency oscillator coupled to two amplifiers through any suitable radio range keying unit. This unit keys the oscillator to produce the two signals conventionally employed to designate pairs of radio range quadrants and impresses the signals so produced upon their respective amplifiers. Provision is made for varying the volume and relative intensities of the signals so that the instructor may produce any desired radio range signal. The output sides of the amplifiers are connected to pass the generated signal through the audio stage of the usual radio receiver carried by the airplane, thus producing a realistic aural signal in which the signal simulating the desired signal of the radio range beacon is projected against the usual background noises of the receiver.

With the apparatus of the present invention it is possible for the instructor or safety pilot to exactly reproduce the aural signal of a radio range station or beacon from an on-course signal, through all variations of a bisignal characteristic, to a single signal which is heard on the bisector of a radio range quadrant. Also by manipulating the volume control of the apparatus the instructor may simulate the conditions obtaining on approaching and passing over a radio range beacon. In use the instructor operates the apparatus and orients the radio range signal with respect to lines of reference upon the surface of the earth, as will be pointed out more in detail hereinafter.

In the light of the foregoing it is an object of the present invention to provide an apparatus for training pilots under conditions of actual flight to fly on radio range beams producing aural signals where radio range stations or beacons of the aural type are not available.

It is another object of the present invention to provide an apparatus of the stated character wherein provision is made for varying the volume and relative intensities of artificially generated audio frequency signals so that the instructor or safety pilot may produce any desired radio range signal corresponding to the instantaneous position of the airplane.

It is another and still further object of the present invention to provide an apparatus of the character noted above for producing a realistic artificial aural radio range signal in which the signal simulating the desired signal of the radio range beacon is projected against the usual background noises of the airplane receiver.

Other objects and many of the attendant advantages of this invention will be readily appreciated as the same becomes better understood by reference to the following detailed description when considered in connection with the accompanying sheets of drawings wherein:

Figs. 4A and 4B are partial sectional side elevational views taken on the line 4—4 of Fig.

3 showing the Morse code signal cam and associated contactor of the keying unit in different phases of operation;

Figure 1:
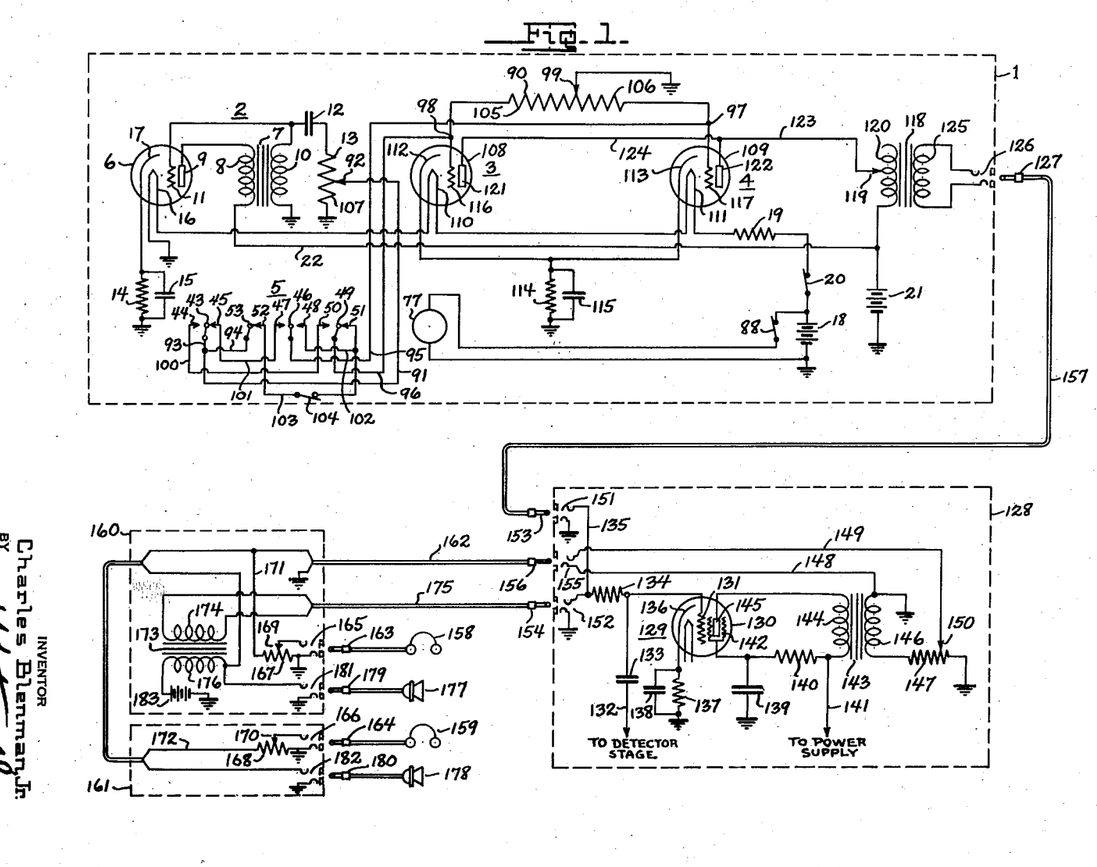
Fig. 1 shows diagrammatically the electrical circuits of the radio range signal generator comprised of the oscillator, keying unit and amplifiers and the connections between the amplifiers and the audio stage of the airplane receiver.

Turning now to Fig. 1 of the drawings the radio range signal generator is shown as including the casing 1 in which are mounted the audio frequency oscillator 2, the amplifiers 3 and 4 and the keying unit 5 for coupling the oscillator to the amplifiers. The casing 1 may be fabricated of any suitable material and is installed in the airplane to be accessible to the instructor or safety pilot and yet so as not to interfere with his control of the airplane. The component parts of the signal generator, it should be noted, are compactly assembled within the casing to produce a construction of limited over-all dimensions. This is highly advantageous since it not only makes the generator quite portable but facilitates installation of the same in the airplane.

The audio frequency oscillator 2 may be of any conventional prior art construction and is shown purely by way of illustration as of the tuned-grid circuit type employing a conventional triode 6 and an audio transformer 7. The primary 8 of the transformer is connected to the plate 9 of the triode and the secondary 10 to the grid 11 thereof, the secondary 10 together with the capacitor 12 and resistor 13 forming the tuned-grid or tank circuit. The circuit constants are to be understood as having such values as to insure the generation of any desired audio frequency, a frequency of 1,000 cycles having been found to give quite satisfactory results. The cathode resistor 14 shunted by the usual by-pass condenser 15 provides the necessary grid bias, while the heater 16 for the cathode 17 is serially energized with those of the amplifiers 3 and 4 by any suitable source of electromotive force 18 acting through the dropping resistor 19 and switch 20. The plate supply voltage for the oscillator 2 is provided by any convenient source of electromotive force 21 connected with the primary 8 of the audio transformer through the conductor 22.

Figure 2:
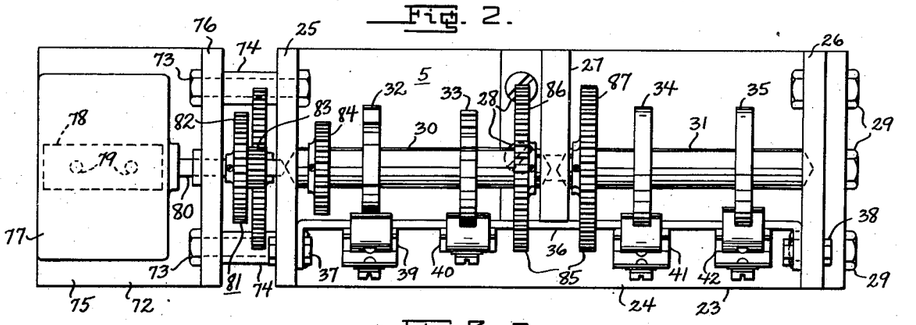
Figs. 2 and 3 are respectively plan and side elevational views of the keying unit forming a part of the signal generator.
Figure 3:
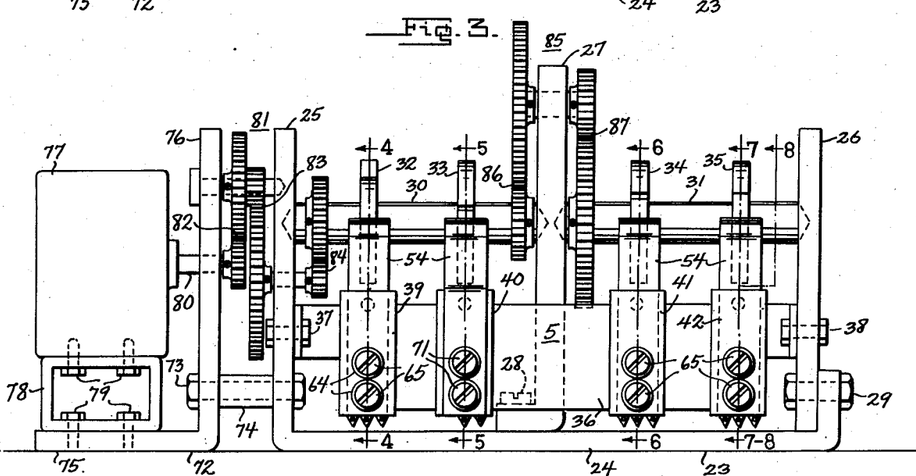

Any suitable radio range keying unit 5 may be employed for keying the oscillator. As illustrating one type of keying unit that may be used in the apparatus of the present invention there is shown in Figs. 2 and 3 a keying frame, identified in general by the reference character 23, including the base plate 24 to which are secured the end bearing plates 25 and 26 and the intermediate bearing plate 27. The end bearing plate 25 is shown integral with the base plate 24, while the intermediate bearing plate 27 and the remaining end plate 26 are preferably removably secured to the base plate 24, as by the screws 28 and bolts 29, to facilitate assembly of the keying unit. The keying cam shaft 30 and the suppressor cam shaft 31 are rotatably supported by the end bearing plates 25, 26 and the intermediate bearing plate 27 in any suitable manner, the bearing plates for this purpose being shown by way of illustration as provided with conically shaped recesses for receiving complementary shaped terminal portions of the cam shafts. A Morse code signal or quadrant cam 32 and one or more station identification cams 33 are secured to the keying shaft 30, while a pair of suppressor cams 34 and 35 is shown secured to the remaining cam shaft 31. The cams may be fabricated of any suitable insulating material as Bakelite, hard rubber or fiber and are splined or otherwise rigidly secured to their respective shafts.

A bracket consisting of the plate 36 is secured to the end plates 25 and 26 of the keying frame in any suitable manner, as by the bolts 37 and 38, and supports the contactors 39, 40, 41, and 42 for cooperation with their respective cams 32, 33, 34 and 35. The Morse code cam contactor 39 and the suppressor cam contactors 41 and 42 are of identical construction and include respectively the movable code contact 43 for alternate engagement with the stationary contacts 44 and 45, the movable suppressor contact 46 for alternate engagement with the stationary contacts 47 and 48 and the movable suppressor contact 49 for alternate engagement with the stationary contacts 50 and 51. The station identification cam contactor 40, on the other hand, includes but a single stationary contact 52 adapted to be engaged by a movable contact 53. The movable contact in each of the contactors is secured to a flexible electrically conductive blade 54 provided with terminal portions 55 and 56 bent or flexed with respect to the intermediate contact supporting portion 57. The upper terminal portions 55 of the flexible blades 54 are arranged for engagement with the peripheral surfaces of their respective cams so that each cam may actuate its contactor at the proper time, while the lower flexed terminal portion 56 of each blade insures that the movable contact will engage a stationary contact when the cams are not in positions to actuate the blades 54.

Figures 4A, 4B:
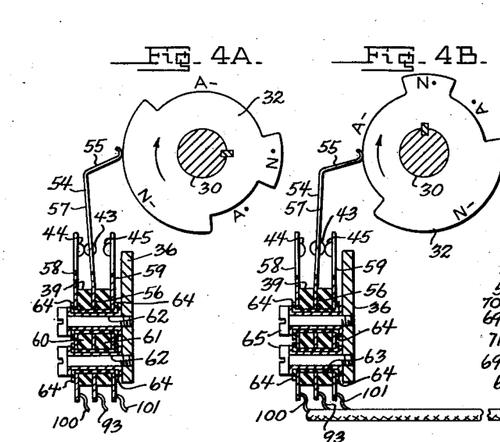
Figures 5, 6A, 7A:
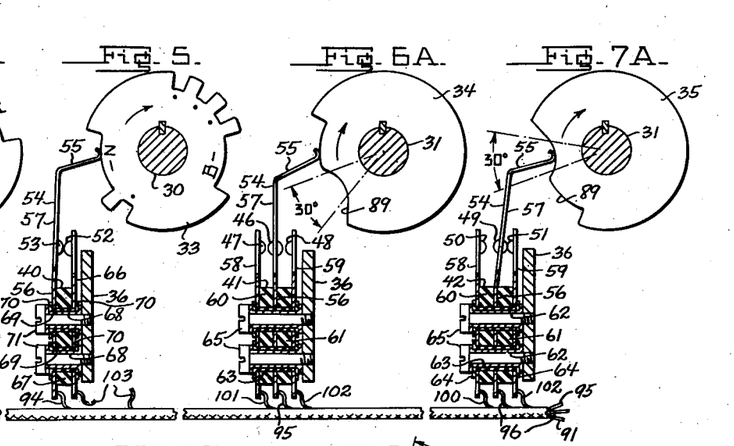
Fig. 5 is a partial sectional side elevational view taken on the line 5—5 of Fig. 3 showing certain details of the station identification signal cam and associated contactor of the keying unit.
Figs. 6A and 7A are partial sectional side elevational views taken on the lines 6—6 and 7—7 respectively of Fig. 3 showing the suppressor cams and associated contactors of the keying unit in a phase of their operation to suppress the signals of the Morse code signal cam but allow the signal of the station identification cam to be impressed upon one of the pair of amplifiers.

As above noted the Morse code cam contactor 39 and the suppressor cam contactors 41 and 42 are identical in construction. For the details of construction reference is made to Figs. 4A, 6A and 7A wherein the stationary contacts are shown secured to electrically conductive blades 58 and 59. The blades 58 and 59 are spaced and electrically insulated from the flexible blade 54 by strips 60 and 61 of any suitable insulating material, the strips and blades being perforated to receive the terminally flanged metallic ferrules 62 for holding the blades 54, 58, 59 and strips 60, 61 in fixed superposed relation. An insulating sleeve 63 and insulating washers 64 are associated with the ferrules in the manner indicated to effectively insulate the three blades and their contacts from each other. The unitary contactors fashioned as described above are rigidly secured to the bracket 36 by the pairs of screws 65, as clearly shown in the drawings. The details of construction of the station identification cam contactor 40 are shown in Fig. 5. As there disclosed the electrically conductive blade 66 carrying the stationary contact is electrically insulated from the flexible blade 54 by the insulating strip 67, the blades and strip being held in fixed superposed relation by the metallic ferrules 68, insulating sleeves 69 and washers 70 all as in the previously described contactors. Screws 71 serve to secure the station identification cam contactor 40 to the bracket 36.

The motor frame 72 (Figs. 2 and 3) is rigidly secured to and spaced from the keying frame 23 by the bolts 73 and spacer sleeves 74 and includes the base plate 75 with which the bearing plate 76 is preferably integral. An electric motor 77 of any conventional prior art construction is secured to the base plate 75 in any suitable manner, as by the bracket 78 and screws 79, and has its shaft 80 connected to drive the keying shaft 30 through a suitable reduction gear identified in general by the reference character 81. While the reduction gear may be of any convenient construction to obtain the desired rotative speed of the keying shaft, it is shown by way of illustration as consisting of three pairs of spur gears 82, 83 and 84 supported in any suitable manner from the bearing plates 25 and 76. The suppressor cam shaft 31 in turn is driven by the keying shaft 30 through a still further reduction gear 85 which may consist of two pairs of spur gears 86 and 87 suitably supported from the intermediate bearing plate 27. The gear ratio of the reduction gear 85 is chosen so as to establish the proper relation between the rotative speeds of the keying and suppressor shafts 30 and 31. The motor 77 (Figs. 1–3) is shown by way of example as of the direct current type and is connected for energization by the common source of electromotive force 18 upon closure of the switch 88.

While the Morse code signal or quadrant cam 32 may be cut to key any two letters of the Morse alphabet for designating pairs of radio range quadrants, it is preferred to cut the cam in a manner to produce complementary interlocked code letters. This has the obvious advantage of producing a continuous and easily recognizable on-course signal when the code signals designating the different radio range quadrants are received with equal intensities. As illustrating a preferred configuration, the Morse code signal cam 32 (Figs. 4A and 4B) is shown cut to key the complementary code letters N and A which are conventionally employed for designating pairs of radio range quadrants. The stepped portions of the cam representing the letter N have recessed portions representing the letter A interspersed therewith to achieve interlocking of the code signals. In Fig. 4A the stepped portion of the signal cam 32 representing the dash of the letter N is in a position to actuate the flexible blade 54 of the contactor 39 and cause the movable contact 43 to engage the stationary contact 44. When the keying of the first part of the letter N has been completed the upper terminal portion 55 of the flexible blade 54 engages the recess of the signal cam representing the dot of the letter A causing the movable contact 43 to disengage the stationary contact 44 and engage the remaining stationary contact 45. After completing the keying of the first part of the letter A the remaining parts of the letters N and A are successively keyed by the alternate engagement of the movable contact 43 with the stationary contacts 44 and 45. The positions occupied by the Morse code signal cam 32 and its contactor 39 shortly before completing a cycle of operation are shown in Fig. 4B. In this manner the code letters N and A may be keyed through any desired number of cycles to produce complementary interlocked signals.

While any desired number of station identification cams may be secured to the shaft 30 for keying the identification signal of the radio range station or beacon whose signal it is desired to simulate, the keying unit is shown for the sake of simplicity as provided with but the single station identification cam 33. This cam may be cut to key any arbitrary identification signal and is shown for illustrative purposes in Fig. 5 of the drawings as cut to key the code letters N and B of the Morse alphabet. The stepped portions of the cam 33 provide the proper spacing between the component parts of the code signal NB by actuating the flexible blade 54 of the contactor 40 to cause the movable contact 53 to disengage the stationary contact 52. The engagement of the upper terminal portion 55 of the flexible blade in the recesses of the station identification cam 33, on the other hand, causes the movable contact 53 to engage the stationary contact 52 and results in the keying of the desired dots and dashes. Thus in a single rotation of the cam 33 the contacts 52 and 53 are alternately engaged and disengaged to key the station identification signal consisting of the code letters N and B.

The suppressor cams 34 and 35 serve to alternately suppress the signals keyed by the radio range quadrant cam 32 and the station identification cam 33. Thus in one phase of their operation the suppressor cams through the action of their associated contactors impress the signals keyed by the A and N quadrant cam on their respective amplifiers while suppressing the signal keyed by the station identification cam; and in a subsequent phase of their operation suppress the signals keyed by the A and N quadrant cam while alternately impressing the signals keyed by the station identification cam on the two amplifiers. To the accomplishment of the foregoing the suppressor cam 34 and associated contactor 41 are arranged exclusively for cooperation with the amplifier 4 and the suppressor cam 35 and associated contactor 42 for exclusive cooperation with the amplifier 3. The arrangement is such that in the phase of operation of the suppressor cams 34 and 35 depicted in Fig. 8 the movable and stationary contacts 46 and 47 of the contactor 41 and the movable and stationary contacts 49 and 50 of the contactor 42 are engaged to permit transmission of the A and N signals while suppressing the station identification signal. As will be pointed out in detail hereinafter the engagement of the contacts 46 and 47 of the contactor 41 allows the A signal to be impressed exclusively on the amplifier 4 and the engagement of the contacts 49 and 50 of the contactor 42 allows the N signal to be impressed exclusively on the amplifier 3.

Figures 6B, 7B, 8:
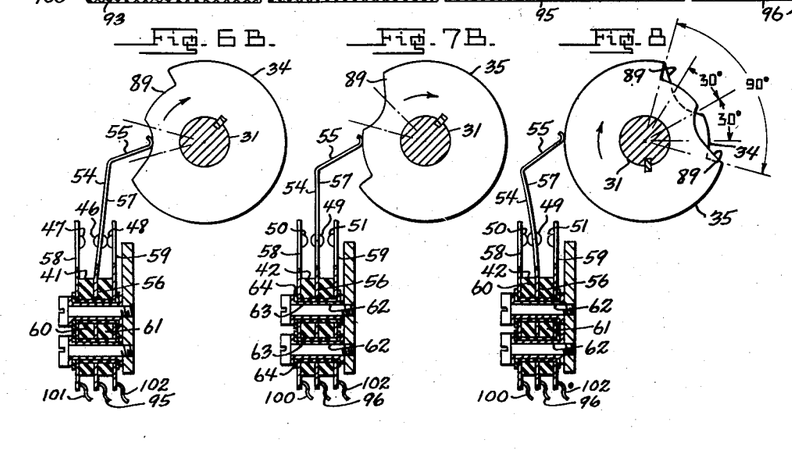
Figs. 6B and 7B are partial sectional side elevational views also taken on the lines 6—6 and 7—7 respectively of Fig. 3 showing the suppressor cams and associated contactors of the keying unit in another phase of their operation to suppress the signals of the Morse code signal cam but allow the signal of the station identification cam to be impressed upon the other of the pair of amplifiers.
Fig. 8 is a partial side elevational view taken on the line 8—8 of Fig. 3 showing the suppressor cams and associated contacts of the keying unit in a still further phase of their operation to suppress the signal of the station identification cam but allow the signals of the Morse code signal cam to be impressed upon their respective amplifiers.

The subsequent suppression of the A and N signals and the alternate impression of the station identification signal on the two amplifiers is preferably achieved through cutting the suppressor cams 34 and 35 along a 90° arc in an identical but complementary fashion as shown in Figs. 6A and 7A and by mechanically phasing these two cams on the suppressor cam shaft 31 as indicated in Fig. 8. The suppressor cams 34 and 35 are shown by way of illustration as cut to provide identical cam surfaces 89 in which a 30° arc of each surface permits engagement of the movable contact with the remaining stationary contact when the 30° arc and terminal portion 55 of the flexible contactor blade are in juxtaposed relation. All other portions of the cam surface 89 hold the movable and both stationary contacts of the contactors out of engagement. By mechanically phasing the suppressor cams 34 and 35 to position the 30° cam surfaces as indicated in Fig. 8, alternate and successive impression of the station identification signal is assured.

Thus in the phase of operation of the suppressor cams depicted in Figs. 6A and 7A the movable contacts 46 and 49 of the contactors 41 and 42 have disengaged their respective stationary contacts 47 and 50 to suppress the A and N signals, the movable contact 49 of the contactor 42, however, having engaged the stationary contact 51 to impress the station identification signal on the amplifier 3. The arrangement is preferably such that a single revolution of the station identification cam 33 takes place while the terminal portion 55 of the flexible blade of the contactor 42 and the 30° arc of the cam surface are in juxtaposed relation. Thus upon completion of a single revolution of the station identification cam 33 the identification signal will have been impressed on the amplifier 3 and the suppressor cams 34 and 35 will have been further rotated to cause the movable contact 49 of the contactor 42 to disengage its stationary contact 51 and to permit the movable contact 46 of the contactor 41 to engage its stationary contact 48, as clearly indicated in Figs. 6B and 7B. In the phase of operation of the suppressor cams illustrated in Figs. 6B and 7B the station identification signal is now being impressed upon the amplifier 4, the impression of the signal occurring during the second revolution of the station identification cam 33 and while the terminal portion 55 of the flexible blade of the contactor 41 and the 30° arc of the suppressor cam 34 are in juxtaposed relation.

In this manner alternate and successive impression of the station identification signal on the two amplifiers is insured while suppressing the A and N signals.

Since in the preferred construction described above one revolution of the station identification cam 33 with shaft 30 takes place during a 30° revolution of the suppressor cams 34 and 35 on the shaft 31, it follows that the gear ratio of the intermediate reduction gear 85 must be 12:1 if the proper ratio between the rotative speeds of the keying and suppressor shafts 30 and 31 is to be established. In a cycle of operation of the keying unit, therefore, the keying shaft 30 will make nine revolutions and the suppressor shaft 31 three-quarters of a revolution during which the Morse code signal cam 32 and contactor 39 will key the letters A and N nine times, while the station identification signal being keyed by the station identification cam 33 and contactor 40 is being suppressed by the suppressor cams 34, 35 and contactors 41 and 42 as illustrated in Fig. 8. These nine revolutions of the keying shaft 30 are followed by three revolutions of this shaft and a one-quarter revolution of the suppressor shaft 31 during which the station identification cam 33 and associated contactor 40 will key the station identification signal three times, while the A and N signals keyed by the Morse code signal cam 32 and contactor 39 are being suppressed by the suppressor cams 34, 35 and contactors 41 and 42 as illustrated in Figs. 6A and 7A and Figs. 6B and 7B. Only two of the identification signals keyed by the station identification cam 33 and its contactor 40, however, are impressed on the amplifiers 3 and 4 by the action of the suppressor cams 34, 35 and their contactors 41, 42 for reasons already noted. The cycle of operation described above is then repeated, the period of each cycle being determined by the rotative speed of the keying shaft 30. In this connection a speed of from 15 to 20 revolutions of the keying shaft per minute has been found to give a convenient keying period.

In order to produce voltages corresponding to the keyed signals for subsequent impression on the amplifiers, a resistor 90 (Fig. 1) is arranged to be connected to the tuned circuit of the oscillator 2 through the keying unit 5. The details of the electrical connections between the contactors of the keying unit 5, on the one hand, and resistor 90 and tuned circuit of the oscillator 2, on the other hand, for accomplishing this purpose are shown in Figs. 1, 4B, 5, 6A, and 7A. As there indicated a common conductor 91 provided with a contact 92 slidably engaging the resistor 13 of the tuned circuit is connected to the conductors 93 and 94 secured respectively to the flexible blades 54 of the Morse code and station identification cam contactors 39 and 40. The flexible blades 54 of the suppressor cam contactors 41 and 42 in turn are connected by the respective conductors 95 and 96 to the terminals 97 and 98 of the resistor 90, which is provided with the sliding contact 99 having a ground in common with the resistor 13 of the tuned circuit. A conductor 100 interconnects the stationary contact 44 of the Morse code cam contactor 39 with the stationary contact 50 of the suppressor cam contactor 42, conductor 101 connects the other stationary contact 45 of the Morse code contactor 39 with the stationary contact 47 of the suppressor cam contactor 41, and conductors 102 and 103 connect the remaining stationary contacts 48 and 51 of the suppressor cam contactors 41 and 42 with the stationary contact 52 of the station identification cam contactor 40. A switch 104 is optionally provided for interrupting the circuit of the station identification cam contactor 40 when this is desired. As will appear presently the slidable contact 92 cooperating with the resistor 13 of the tuned circuit provides a volume control for the keyed signals, while the slidable contact 99 cooperating with the resistor 90 makes it possible to vary the relative intensities of the keyed signals.

The circuit connections described above are such that the portions 105 and 106 of the resistor 90 between the terminals 97 and 98 and the grounded contact 99 are alternately connected in parallel with the portion 107 of the tank resistor 13 between the slidable contact 92 and ground, the letter N of the Morse code signal during this connection being impressed solely on the resistor portion 105 and the letter A solely on the resistor portion 106. That this is so becomes evident from a consideration of the suppressor cams 34, 35 and their associated contactors 41, 42 in their phase of operation depicted in Fig. 8 where the movable contacts 46 and 49 are engaged with their respective stationary contacts 47 and 50. When now the movable contact 43 of the Morse code contactor 39 (Figs. 1, 4A, and 4B) is moved by the cam 32 to engage the stationary contact 44 and commence keying the letter N, the slidable contact 92 of the tank resistor 13 is connected to the terminal 98 of the resistor 90. This connection is completed through the conductors 91 and 93, the contacts 43 and 44 of the Morse code contactor 39, the conductor 100, the contacts 49 and 50 of the suppressor cam contactor 42 and the conductor 96. By this connection the resistor portion 105 is placed in parallel with the portion 107 of the tank resistor and an audio frequency voltage is impressed on this combination of resistors corresponding to the dash of the code letter N.

Upon further rotation of the Morse code cam 32 with the contacts of the suppressor contactors still engaged as in Fig. 8, the flexible blade 54 of the Morse contactor 39 (Figs. 1 and 4A) moves to engage a recess of the Morse code cam 32 with the attendant engagement of the movable and stationary contacts 43 and 45 and keying of the dot of the letter A. In so doing the slidable contact 92 of the tank resistor 13 is disconnected from the terminal 98 of the resistor 90 and is connected instead to the terminal 97 thereof. This connection is completed through the conductors 91 and 93, the contacts 43 and 45 of the Morse code contactor 39, the conductor 101, the contacts 46 and 47 of the suppressor cam contactor 41 and the conductor 95. By this connection the other resistor portion 106 is placed in parallel with the portion 107 of the tank resistor and an audio frequency voltage is impressed on the combination of resistors corresponding to the dot of the code letter A. After completing the keying of the first part of the letter A, the remaining parts of the letters N and A are successively keyed by the alternate engagement of the movable Morse code contact 43 with the stationary contacts 44 and 45. In so doing the resistor portions 105 and 106 are alternately connected in parallel with the resistor portion 107 of the tank circuit, these connections being accompanied by the impression of audio frequency voltages on the pairs of connected resistors corresponding to the dot and dash of the code letters N and A respectively. It should thus be clear that with the contacts of the suppressor cam contactors engaged as shown in Fig. 8 complementary interlocked signal voltages will be alternately impressed on the resistor portions 105 and 106, the letter N of the Morse code being impressed solely on the resistor portion 105 and the letter A solely on the resistor portion 106.

After the A and N code letters have been keyed nine times as previously described the movable contacts 46 and 49 of the suppressor contactors 41 and 42 (Figs. 1, 6A and 7A) will move to disengage their respective stationary contacts 47 and 50 to suppress the A and N signals, the movable contact 49 of the supressor cam contactor 42 at the same time moving to engage the stationary contact 51 so that the station identification signal keyed by the cam 33 and its associated cam contactor 40 (Fig. 5) may be impressed upon the resistor portion 105. When now the station identification cam 33 allows the movable contact 53 of its contactor 40 to engage the stationary contact 52 to begin keying the station identification signal, the slidable contact 92 of the tank resistor 13 is again connected to the terminal 98 of the resistor 90 on the assumption that the switch 104 is closed. This connection is completed through the conductors 91 and 94, the contacts 52 and 53 of the station identification cam contactor 40, the conductor 103, the contacts 49 and 51 of the suppressor cam contactor 42 and the conductor 96. By this connection the resistor portion 105 is placed in parallel with the portion 107 of the tank resistor and an audio frequency voltage is impressed on the combination of resistors corresponding to the dashes and dots keyed by the station identification cam 33 and its associated contactor 40.

Upon completion of a single revolution of the station identification cam 33 to key the signal as described above, the suppressor cams 34 and 35 (Figs. 1, 6B and 7B) will have been further rotated to cause the movable contact 49 of the contactor 42 to disengage its stationary contact 51 and permit the movable contact 46 of the contactor 41 to engage its stationary contact 48. When now the station identification cam 33 allows the movable contact 53 to engage the stationary contact 52 to recommence keying the station identification signal, the slidable contact 92 of the tank resistor 13 will be connected to the remaining terminal 97 of the resistor 90. This connection is completed through the conductors 91 and 94, the contacts 52 and 53 of the station identification cam contactor 40, the conductors 103 and 102, the contacts 46 and 48 of the suppressor cam contactor 41 and the conductor 95. By this connection the resistor portion 106 is placed in parallel with the portion 107 of the tank resistor and an audio frequency voltage, as before, is impressed on the combination of resistors corresponding to the dashes and dots keyed by the station identification cam 33 and its associated contactor 40. It should thus be clear that with the contacts of the suppressor contactors positioned to suppress the A and N signals, voltages corresponding to the identification signals will be alternately impressed upon the resistor portions 105 and 106.

The slidable contact 99 (Fig. 1) engaging the resistor 90 makes it possible to vary the relative intensities of the signal voltages impressed upon the resistor portions 105 and 106. Thus with the contact 99 positioned to engage the midpoint of the resistor 90 equal portions 105 and 106 of the resistor will be alternately connected in parallel with the resistor portion 107 of the tank circuit, with the result that the signal voltages impressed upon the resistor portions 105 and 106 will be equal. If, on the other hand, the slidable contact 99 is moved to a position on either side of its mid-position, it is evident that unequal resistor portions 105 and 106 will be alternately connected in parallel with the resistor portion 107 of the tank circuit. In this position of the slidable contact 99, therefore, a smaller signal voltage will be impressed across the smaller of the resistor portions 105 and 106 while a larger voltage will be impressed across the larger of the resistor portions. When the slidable contact 99 is finally moved into terminal engagement with the resistor 90 all of this resistor will be connected in parallel with the resistor portion 107 of the tank circuit in one phase of operation of the keying unit, while in a subsequent phase of its operation the resistor portion 107 of the tank circuit will be short-circuited. Under these circumstances maximum and zero signal voltages are alternately produced. By adjusting the slidable contact 92 along the tank resistor 13 the magnitude of the signal voltages across the resistor portions 105 and 106 may be controlled.

Thus it should be clear that the adjustable contact 99 in cooperation with the resistor 90 makes it possible to increase the amplitude of one signal voltage while simultaneously decreasing the amplitude of the other and that the adjustable contact 92 in cooperation with the tank resistor 13 controls the volume or magnitude of these signals. Both of the slidable contacts 92 and 99 are under the control of the instructor or safety pilot, who is thus able to produce signal voltages across the resistor portions 105 and 106 simulating those of a radio range beacon or station from an on-course signal, through all variations of a bisignal characteristic, to a single signal designating the bisector of a radio range quadrant. The signal voltage produced across the resistor portion 105 provides the excitation for the amplifier 3 and that produced across the resistor portion 106 the excitation for the amplifier 4. Since the letter N of the Morse code signal is impressed solely on the resistor portion 105 and the letter A solely on the resistor portion 106, it follows that separate amplifiers are provided for amplifying the two signals conventionally employed for designating pairs of radio range quadrants.

The tubes of the amplifiers may be of any convenient prior art construction and are shown by way of illustration as triodes 108 and 109 in which the respective heaters 110 and 111 are connected with the heater 16 of the oscillator triode for series energization, all as previously noted. The cathodes 112 and 113 are connected to the common cathode resistor 114 shunted by the usual by-pass condenser 115 to provide a source of grid bias for class A operation, while the grids 116 and 117 are shown connected to the terminals 97 and 98 of the resistor 90. A variable impedance audio transformer 118 provides a proper match between the amplifiers, on the one hand, and the radio receiver and intercommunication system of the airplane, on the other hand. The adjustable contact 119 associated with one end of the tapped primary 120 of this transformer is shown connected to the anodes 121 and 122 of the amplifiers by the conductors 123 and 124, the remaining end of the primary 120 being connected to the common source of electromotive force 21 which serves as the plate supply voltage. The secondary 125 of the audio transformer 118 is shown provided with a conventional jack 126 to receive the usual cable plug 127 so that the radio range signal generator described in detail above may be connected to the radio receiver carried by the airplane. From the foregoing it should be clear that the signal voltages produced across the resistor portions 105 and 106 provide the excitation for the amplifiers 3 and 4 respectively. For the input or control circuit of the amplifier 3 includes the cathode 112, the cathode resistor 114 shunted by the condenser 115, the resistor portion 105 and grid 116, while that of the amplifier 4 includes the cathode 113, the cathode resistor 114 shunted by the condenser 115, the resistor portion 106 and the grid 117.

The airplane radio receiver may be of any conventional prior art construction, only those portions of the receiver being shown in Fig. 1 which are essential to an understanding of the present invention. As there indicated the receiver includes a casing 128 in which, among other things, there may be mounted one or more audio amplifier stages 129 biased for class A operation. The amplifier tube of the audio stage is shown by way of example as a tetrode 130 in which the control grid 131 is to be understood as being connected to the detector stage through the conductor 132, the coupling condenser 133, the grid leak resistor 134 and the conductor 135. The cathode 136 is connected to the cathode resistor 137 shunted by the usual by-pass condenser 138 to provide a source of grid bias, while the condenser 139 and dropping resistor 140 connected by the conductor 141 to the power supply provide the proper voltage for the screen grid 142. An audio transformer 143 has its primary 144 connected to the anode 145 and to the conductor 141 leading to the power supply and its secondary 146 connected in series with the load resistor 147. The conductor 148 connected with the grounded secondary terminal and the conductor 149 with its contact 150 slidably engaging the load resistor 147 provide the usual volume control for the receiver. Jacks 151 and 152 connected to the input side of the audio stage 129 are arranged to receive the cable plugs 153 and 154 respectively so that the signal generator and the intercommunication system may be connected to the radio receiver. A jack 155 connected to the output side of the audio stage 129 through the conductors 148 and 149 is arranged to receive the cable plug 156 so that the control boxes for the pilot and instructor may also be connected with the receiver.

The radio range signal is impressed upon the audio stage of the receiver through the cable 157 interconnecting the signal generator with the receiver and is heard as an audible signal in the headphones 158 and 159 of the respective control boxes 160 and 161 connected to the output side of the receiver audio stage by the cable 162. The headphones 158 and 159, it will be observed, are provided with plugs 163 and 164 for connection respectively with the jack 165 of the instructor's control box 160 and with the jack 166 of the pilot's control box 161. The jacks 165 and 166 in turn are connected to auxiliary volume controls consisting of the resistors 167 and 168 and slidable contacts 169 and 170, the two resistors 167 and 168 of the volume controls being connected in parallel across the terminals of the cable 162 by the conductors 171 and 172 and the common ground. In order that the instructor and pilot may converse with each other while the airplane is in flight, an audio transformer 173 is provided with its secondary 174 connected by the inter-phone cable 175 to the input side of the receiver audio stage and with its primary 176 connected to the microphones 177 and 178 of the respective control boxes 160 and 161. The microphones 177 and 178 are also provided with plugs 179 and 180 for connection with the jacks 181 and 182 of the respective control boxes 160 and 161, these jacks in turn being connected to the primary 176 of the audio transformer through the common source of electromotive force 183.

There is thus provided an aviation training apparatus in which the output of the radio range signal generator is channeled through the audio stage of the airplane receiver to produce in the two headphones a realistic aural signal in which the signal simulating the desired signal of the radio range beacon is projected against the usual background noises of the receiver. With this apparatus it is possible for the instructor or safety pilot through manipulation of the radio range signal control 99 (Fig. 1) of the generator to exactly reproduce the aural signal of a radio range station or beacon from an on-course signal, through all variations of a bi-signal characteristic, to a single signal which is heard on the bisector of a radio range quadrant. Also by manipulating the volume control 92 (Fig. 1) of the signal generator, the instructor may simulate the conditions obtaining on approaching and passing over a radio range beacon. This latter feature is of considerable importance. For the sure knowledge on the part of the pilot when passing through a cone of silence above the radio range station is indispensable to successful instrument flying. Finally, it is to be observed that the instructor as well as the pilot hears the signal; and that the instructor and pilot may converse with each other during the training flight as an aid in instructing the pilot. The fact that the instructor hears the signal is important, since by this arrangement it is possible for him to adjust the controls 92 and 99 (Fig. 1) of the generator to produce a signal corresponding to the position of the airplane.

In use the instructor manipulates the controls of the signal generator and orients the signal with respect to lines of reference upon the surface of the earth which are assumed to represent beam legs or tracks. Any long straight line over the surface of the earth may be used as a beam leg or track. Thus a long stretch of railroad right of way, a straight highway, a canal or the beach line or section of a coast provide excellent beam tracks. Other roads or railroads which cross or intersect any of the above may be used as other beam tracks and their intersection may serve to fix the position of the radio range station with its corresponding cone of silence. The actual reference lines or beam tracks to be used on an instrument training flight are selected in advance by consulting a sectional airways chart, an intersection therebetween fixing and being chosen as the radio range station. The magnetic bearings of the reference lines to be used are then plotted on sheets of paper of convenient size to provide reference charts for use by the pilot and instructor in assisting them to achieve a proper orientation during the training flight. The A and N quadrants are marked on the reference charts following the standard designation of such sectors.

When the pilot is ready to commence his training the hood is closed over his cockpit and the instructor, who is also the safety pilot, flies the airplane to a location in one of the quadrants where he can fix the airplane's position visually with respect to the reference lines. The radio range signal generator in the instructor's cockpit is then set in operation to produce a signal corresponding to the position of the airplane, and the controls are turned over to the pilot under the hood. From then on the instructor varies the signal and volume to correspond to the changes of position of the airplane. Whenever a reference line is intersected the pilot hears an on-course signal and when he flies directly over the intersection selected, the instructor manipulates the volume control of the signal generator to simulate passing through a cone of silence. Any beam orientation problem including let-down procedure can thus be simply and conveniently presented to a pilot undergoing training by an instructor who is familiar with the radio beam transmitter and who is proficient at contact navigation and the judgment of distances on the ground from the air.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and manufactured by or for the Government of the United States of America for governmental purposes without the payment of any royalties thereon or therefor.

I claim:

1. An apparatus for simulating the aural signal of a radio range beacon adapted to an airplane radio for supplemental local communication comprising in combination an audio oscillator, means including a keying unit associated with the oscillator for producing complementary interlocked signals, amplifiers for the respective signals upon which the signals are alternately impressed by the keying unit, means for simultaneously increasing the amplitude of one of the impressed signals while decreasing the amplitude of the other, and means associated with the output sides of said amplifiers for producing an aural signal simulating the desired signal of the radio beacon.

2. An apparatus for simulating the aural signal of a radio range beacon adapted to an airplane radio for supplemental local communication comprising in combination an audio oscillator, means including a keying unit associated with the oscillator for producing complementary interlocked signals, amplifiers for the respective signals upon which the signals are alternately impressed by the keying unit, means for simultaneously increasing the amplitude of one of the impressed signals while decreasing the amplitude of the other, a radio receiver, means for connecting the output sides of said amplifiers to the input side of the audio stage of said receiver, and means connected with the output side of said receiver for producing a realistic aural signal in which the signal simulating the desired signal of the radio range beacon is projected against the usual background noises of the receiver.

3. An apparatus for simulating the aural signal of a radio range beacon adapted to an airplane radio for supplemental local communication comprising in combination an audio oscillator, means including a keying unit associated with the oscillator for producing complementary interlocked signals, amplifiers for the respective signals upon which the signals are alternately impressed by the keying unit, means for simultaneously increasing the amplitude of one of the impressed signals while decreasing the amplitude of the other, a radio receiver, means for connecting the output sides of said amplifiers to the input side of the audio stage of said receiver and means connected with the output side of said receiver for producing a realistic aural signal for both the pilot and instructor in which the signal simulating the desired signal of the radio range beacon is projected against the usual background noises of the receiver.

4. An apparatus for instructing a pilot to fly on a radio beam the apparatus being adapted to an airplane radio for supplemental local communication comprising in combination a radio receiver and means under the control of the instructor for producing an audio frequency signal simulating the desired signal of a radio range beacon, the said signal producing means being connected to the radio receiver to produce a realistic aural signal in which the signal simulating the desired signal of the radio beacon is projected against the usual background noises of the receiver.

5. An apparatus for instructing a pilot to fly on a radio beam the apparatus being adapted to an airplane radio for supplemental local communication comprising in combination a radio receiver, headphones for the pilot and instructor connected to the receiver and means including a pair of amplifiers with adjustable excitation under the control of the instructor for producing an audio frequency signal simulating the desired signal of a radio range beacon, the said signal producing means being connected to the radio receiver to produce a realistic aural signal in the headphones in which the signal simulating the desired signal of the radio beacon is projected against the usual background noises of the receiver.

6. An apparatus for simulating the aural signal of a radio range beacon adapted to an airplane radio for supplemental local communication comprising in combination an audio oscillator, means including a keying unit associated with the oscillator for producing artificial radio range signals, means for varying the ratio of the amplitudes of the signals, amplifiers for the respective signals upon which the signals are alternately impressed by the keying unit, and means associated with the output sides of said amplifiers for producing an aural signal simulating the desired signal of the radio beacon.

7. An apparatus for simulating the aural signal of a radio range beacon adapted to an airplane radio for supplemental local communication comprising in combination an audio oscillator, means including a keying unit associated with the oscillator for producing artificial radio range signals, means for varying the magnitude of the signals and the ratio of their amplitudes, amplifiers for the respective signals upon which the signals are alternately impressed by the keying unit, and means associated with the output sides of said amplifiers for producing an aural signal simulating the desired signal of the radio beacon.

8. An apparatus for simulating the aural signal of a radio range beacon adapted to an airplane radio for supplemental local communication comprising in combination an audio oscillator, means including a keying unit associated with the oscillator for producing a series of complementary interlocked signals followed by beacon identification signals, means for varying the magnitude of the signals and the ratio of their amplitudes, amplifiers for the signals upon which the signals are alternately impressed by the keying unit, and means associated with the outout sides of said amplifiers for producing an aural signal simulating the desired signal of the radio beacon.

9. An apparatus for simulating the aural signal of a radio range beacon adapted to an airplane radio for supplemental local communication comprising in combination an audio oscillator, means including a resistor and a keying unit operable to connect portions of the same to the oscillator for producing artificial radio range signals, a plurality of triode amplifiers between the grids of which the aforesaid resistor is connected and upon which the signals are alternately impressed by the keying unit, means for varying the ratio of the amplitudes of the signals and means associated with the output sides of said amplifiers for producing an aural signal simulating the desired signal of the radio beacon.

10. An apparatus for simulating the aural signal of a radio range beacon adapted to an airplane radio for supplemental local communication comprising in combination an audio oscillator, means including a resistor and a keying unit operable to connect portions of the same to the oscillator for producing complementary interlocked signals, a plurality of triode amplifiers between the grids of which the aforesaid resistor is connected and upon which the signals are alternately impressed by the keying unit, means for varying the magnitude of the signals and the ratio of their amplitudes, and means associated with the output sides of said amplifiers for producing an aural signal simulating the desired signal of the radio beacon.

11. An apparatus for simulating the aural signal of a radio range beacon adapted to an airplane radio for supplemental local communication comprising in combination an audio oscillator, a plurality of amplifiers in the control circuit of each of which there is included a resistor, a keying unit for alternately connecting the resistors to the oscillator to produce voltages thereacross corresponding to the radio range signals, and means associated with the output sides of said amplifiers for producing an aural signal simulating the desired signal of the radio beacon.

12. An apparatus for simulating the aural signal of a radio range beacon adapted to an airplane radio for supplemental local communication comprising in combination an audio oscillator, a plurality of amplifiers in the control circuit of each of which there is included a variable resistor, means for reciprocally varying the magnitudes of the resistors, a keying unit for alternately connecting the resistors to the oscillator to produce voltages thereacross corresponding to the radio range signals, and means associated with the output sides of said amplifiers for producing an aural signal simulating the desired signal of the radio beacon.

13. An apparatus for simulating the aural signal of a radio range beacon adapted to an airplane radio for supplemental local communication comprising in combination an audio oscillator the tuned circuit of which includes a load resistor, a plurality of amplifiers in the control circuit of each of which there is included a variable resistor, means for reciprocally varying the magnitudes of the amplifier resistors, a keying unit for alternately connecting the amplifier resistors in parallel with a selected portion of the oscillator resistor to produce voltages across the amplifier resistors corresponding to the radio range signals, and means associated with the output sides of said amplifiers for producing an aural signal simulating the desired signal of the radio beacon.

CHARLES BLENMAN, Jr.